(12) United States Patent
Aoike et al.

(10) Patent No.: US 9,651,156 B2
(45) Date of Patent: May 16, 2017

(54) MECHANICAL SEAL

(75) Inventors: Hiroshi Aoike, Tokyo (JP); Hideyuki Inoue, Tokyo (JP); Takuji Matsuki, Tokyo (JP); Masaru Nakamura, Tokyo (JP); Hiroki Takeno, Tokyo (JP); Yoshihiro Teshima, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 226 days.

(21) Appl. No.: 13/322,806

(22) PCT Filed: Oct. 25, 2010

(86) PCT No.: PCT/JP2010/068867
§ 371 (c)(1),
(2), (4) Date: Nov. 28, 2011

(87) PCT Pub. No.: WO2011/052544
PCT Pub. Date: May 5, 2011

(65) Prior Publication Data
US 2012/0201673 A1    Aug. 9, 2012

(30) Foreign Application Priority Data

Oct. 30, 2009 (JP) ................. 2009-250343

(51) Int. Cl.
*F16J 15/34* (2006.01)

(52) U.S. Cl.
CPC ....... *F16J 15/3404* (2013.01); *F16J 15/3464* (2013.01); *F16J 15/34* (2013.01); *F16J 15/342* (2013.01)

(58) Field of Classification Search
CPC .. F16J 15/3404; F16J 15/3468; F16J 15/3412; F16J 15/342
(Continued)

(56) References Cited

U.S. PATENT DOCUMENTS 3,489,419 A * 1/1970 Stratienko .................. 277/408
4,103,907 A * 8/1978 Inouye et al. ............... 277/400
(Continued)

FOREIGN PATENT DOCUMENTS

GB    2347180 A    8/2000
GB    1386931 A    10/2003
(Continued)

OTHER PUBLICATIONS

Corresponding JP office action dated Feb. 25, 2014.
Corresponding EPO Extended Search Report dated Jan. 29, 2016.

*Primary Examiner* — Nicholas L Foster
(74) *Attorney, Agent, or Firm* — Harness, Dickey & Pierce, P.L.C.

(57) ABSTRACT

Provided is a mechanical seal that ensures the flow rate of a cooling fluid, which is necessary to cool a slide seal surface, and that can prevent erosion from occurring. In the mechanical seal, the ratio between the depth and the width of each groove of a partial impeller is 2.0-5.0; the ratio of the distance between the grooves of the partial impeller to the width of a weir of a casing is 0.5-3.1; the ratio of the total length of the widths of the grooves of the partial impeller to the total length of the peripheral surface of the partial impeller, in which the grooves are formed, is 0.28-0.8; or the ratio of the length of the projected portion of the tip of each groove of the partial impeller to the width of a cooling liquid discharging groove of the casing is greater than 0 and less than or equal to 0.65.

5 Claims, 16 Drawing Sheets

(58) Field of Classification Search
USPC .................................................. 277/400, 408
See application file for complete search history.

(56) References Cited

U.S. PATENT DOCUMENTS

| | | | |
|---|---|---|---|
| 4,290,611 A | | 9/1981 | Sedy |
| 4,560,173 A | * | 12/1985 | Adams et al. ................. 277/367 |
| 5,158,304 A | * | 10/1992 | Orlowski ....................... 277/421 |
| 6,428,011 B1 | * | 8/2002 | Oskouei ........................ 277/358 |
| 7,938,404 B2 | * | 5/2011 | Hagen et al. .................. 277/369 |
| 8,042,813 B2 | * | 10/2011 | Kung ............................ 277/370 |
| 8,177,236 B2 | * | 5/2012 | Anderberg .................... 277/408 |
| 2009/0200749 A1 | * | 8/2009 | Teshima et al. ............... 277/512 |
| 2014/0091530 A1 | * | 4/2014 | Aoike et al. .................. 277/358 |

FOREIGN PATENT DOCUMENTS

| | | |
|---|---|---|
| JP | 59-068866 | 5/1984 |
| JP | 417569 U | 2/1992 |
| JP | 07012238 A | 1/1995 |
| JP | 07097999 A | 4/1995 |
| JP | 2002-98237 * | 4/2002 |
| JP | 200370906 A | 3/2003 |
| JP | 2003074712 | 3/2003 |

\* cited by examiner

MECHANICAL SEAL

TECHNICAL FIELD

The present invention relates to a mechanical seal with a partial impeller which circulates the cooling fluid nearby the seal face.

BACKGROUND ART

As the mechanical seal with the partial impeller which cools the seal face by efficiently sending the cooling fluid (mainly cooling water) around the sliding seal face which generates the heat, conventionally, for example, the mechanical seal shown in FIG. 12 is known (refer to U.S. Pat. No. 4,290,611 (Patent document 1), JP Patent No. 3782690 (Patent document 2)).

The mechanical seal shown in FIG. 12 comprises a rotational ring 941 having a seal face S1, and a stationary ring 942 having a seal face S2; and the partial impeller 920 is formed on the inside of the sleeve 910 fitting on the rotary shaft 902. Also, a casing 930 is formed with a cooling fluid inlet bore 931 penetrating nearby a seal part 940, and a cooling fluid outlet bore 932 penetrating into the outer side from the nearby area of the partial impeller 920. These cooling fluid inlet bore 931 and cooling fluid outlet bore 932 are connected by the pipes which connects with the cooler 950 at the outside. The cooling fluid which flows into the nearby area of the seal part 940 from the cooling fluid inlet bore 931 cools the seal part 940 and flows out from the cooling fluid outlet bore 932, then recooled by the cooler 950 thereby it are designed to circulate.

The main function of such partial impeller 920 is to cool the heat generated at seal part 940, and the ability demanded is to provide the cooling fluid in a necessary flow rate.

Note that, as the shape of the partial impeller 920, a groove having an approximate half circular shape in its cross section, a groove having a conical shape of the cross section of half circular shape, and a groove having a cross section of a rectangular shape or so may be mentioned (for example, JP Utility Design No. H04-17569 (Patent document 3)).

Also the groove tip portion 920a on the inside of the partial impeller 920 approximately matches the end portion 933a on the inside of the groove 933 connecting to the cooling fluid outlet bore 932 of the casing 930.

PRIOR ART DOCUMENT

Patent Document

Patent document 1: U.S. Pat. No. 4,290,611
Patent document 2: JP Patent No. 3782690
Patent document 3: JP Utility Model No. H04-17569

DISCLOSURE OF THE INVENTION

Technical Problems to be Solved by the Invention

As discussed in the above, the conventional partial impeller have a groove (the partial impeller groove) with a rectangular shape or the approximate half circular shape in the cross sectional shape, the groove tip portion approximately matches the edge of the groove of the casing, and, as the result of such shape and placement, the flow rate necessary for cooling the seal portion was obtained. However, in such constitution, the erosion is generated at the dam portion formed at the groove of the casing, and in some cases, the dam was broken. If the dam is broken, the flow rate of the cooling fluid necessary for the cooling couldn't be provided, and as a result, even though the amount necessary for the cooling could be provided at the beginning of the operation, the dam portion is damaged by the erosion generated at the dam portion of the casing during the operation, thus in some cases, the necessary flow rate couldn't be obtained at relatively short period of time.

The present invention was accomplished by reflecting the above such situation, and the object of the present invention is to secure the flow rate of the cooling fluid necessary for cooling the sliding seal face, and to provide the mechanical seal with the partial impeller capable of preventing from generating the erosion.

Means for Solving the Technical Problems

In order to solve the objects, the present inventors has analyzed the movement of the fluid by the simulations based on the computational fluid dynamics in regards with the case wherein the erosion is generated. Thereby the present inventors have found that when the partial impeller with the groove having the cross sectional shape of half-circle or rectangular shape rotates, the sealing fluid pressure drastically changes to above vapor pressure from below vapor pressure at the part of the dam of the casing. Thereby, it was speculated that the cavitations is generated at the part where the fluid becomes above vapor pressure, and the cavitations disappears at the part where the fluid is below vapor pressure.

Also, from the experiment, it was detected that the erosion is easily generated at the dam portion of the casing operated when the sealed fluid is in the range of 0.1 MPa to 0.4 MPa, and as result of the analysis according to the above simulation, when the pressure of the sealed fluid is less than 0.1 MPa, the fluid pressure is less than vapor pressure at the dam part, however it does not become larger than the vapor pressure nearby the dam. Also, when the pressure of the sealed fluid is larger than 0.4 MPa, it was found that the pressure of the dam part does not become larger than vapor pressure. Further, it is speculated that this indicates that the cavitations does not disappear nearby the dam in either cases. Also, at the cavitation erosion, an enormous pressure is generated when the cavitations disappear and thus the material is eroded. Based on this speculation, by defining the cross sectional shape of the partial impeller groove to a specific shape, the necessary flow rate can be secured, and also the erosion can be prevented; thereby the mechanical seal with the partial impeller according to the present invention was achieved.

Specifically, the present inventors has found that the erosion is generated since the change of the sealed fluid from above vapor pressure to below vapor pressure tends to easily take place at the dam part when the ratio (Lgw/Lgd) of the groove width (Lgw) against the groove depth (Lgd) constituting the partial impeller is small; on the other hand, if the ratio is too large, it becomes difficult to secure the necessary flow rate; hence it is preferable to constitute so that the ratio becomes within preferable range.

Also, when the ratio (Lrw/Ldw) of the distance (Lrw) between the groove of the partial impeller against the dam width (Ldw) of the casing is large, the change of the seal fluid from below vapor pressure to above vapor pressure easily takes place at the dam part, thus the erosion is generated easily; on the other hand, when this ratio (Lrw/Ldw) is small, it becomes difficult to secure the necessary flow rate; hence the present inventors have found that it is preferable to constitute so that the ratio (Lgw/Lgd) becomes within preferable range.

Furthermore, when the ratio (nLgw/2πr) of the total length (nLgw) of the groove width against the circumference length (2πr) where the groove of the partial impeller is formed, is small, the change of the sealed fluid from below vapor pressure to above vapor pressure easily take place at the dam part; thus the erosion is easily generated; on the other hand, when the ratio (nLgw/2πr) is too large, it becomes difficult to secure the necessary flow rate; hence the present inventors has found that it is preferable to constitute so that the ratio (nLgw/2πr) becomes within preferable range.

Further, when the tip of the groove of the partial impeller approximately matches the end portion of the groove of the casing side, the change of the sealed fluid from above vapor pressure to below vapor pressure easily takes place thus the erosion is easily generated; on the other hand when the ratio (Lgs/Ldl) of the protruding length (Lgs) of the tip portion of the groove of the partial impeller against the width (Ldl) of the groove of the casing side is increased, there is an effect to rectify the flow of the fluid nearby the dam part to a parallel direction with the sliding direction; thereby prevents the generation of the erosion. Thus, the present inventors has found that it is preferable to constitute so that the ratio (Lgs/Ldl) becomes within preferable range.

Therefore, the mechanical seal of the present invention is a mechanical seal sealing a space between a housing of an apparatus and a rotary shaft penetrating through a bore formed at the housing, comprising: a rotary ring provided on the rotary shaft and formed with a seal face on at least one face in an axis direction; a stationary ring formed with a seal face which is in close contact and slides against the seal face of the rotary ring; and a partial impeller formed at outer peripheral portion of a ring shaped body placed at the rotary shaft, in which plurality of partial impeller grooves from an end face of one side of the ring shaped body to an outer circumference face is formed equally along a circumferential direction of the outer circumference of the ring shaped body, and characterized in that a ratio (Lgw/Lgd) of a width (Lgw) of the partial impeller groove against a depth (Lgd) of the partial impeller groove constituting the partial impeller is 2.0 or more and 5.0 or less.

Also, another mechanical seal of the present invention is a mechanical seal sealing a space between a housing of an apparatus and a rotary shaft penetrating through a bore formed on the housing, comprising: a rotary ring provided on the rotary shaft and formed with a seal face on at least one face in an axis direction; a stationary ring formed with a seal face which is in close contact and slides against the seal face of the rotary ring; a casing provided with the stationary ring, stores the rotary ring in the inner space and placed around the bore of the housing; a cooling fluid inlet bore penetrating in between an outer peripheral portion of the casing and the inner space, and providing a cooling fluid to the inner space from outside of the casing; a cooling fluid outlet bore penetrating in between the outer peripheral portion of the casing and the inner space, and discharging the cooling fluid to outside from the inner space; a partial impeller formed at the outer peripheral portion of a ring shaped body placed on the rotary shaft, in which partial impeller grooves from the one end face of the ring shaped body to the outer peripheral face is formed by equally distributing along a peripheral direction of the outer peripheral portion of the ring shaped body; and a cooler solution outlet bore which is a ring shaped groove formed along the peripheral direction of a face opposing the partial impeller of an inner peripheral of the casing, in which a dam having a predetermined width covering the grooves in the width direction is formed in part of the grooves and an opening of the inner space side of the cooling fluid outlet bore is formed in front of the dam along the rotating direction of the rotary shaft, and characterized in that a ratio (Lrw/Ldw) of a groove distance (Lrw) which is a distance in between the partial impeller grooves constituting the partial impeller against a width (Ldw) of the dam of the casing is 0.5 or more and 3.1 or less.

Also, still another mechanical seal of the present invention is a mechanical seal sealing a space between a housing of an apparatus and a rotary shaft penetrating a bore formed at the housing, comprising: a rotary ring provided at the rotary shaft and formed with a seal face on at least one face in the axis direction; a stationary ring formed with a seal face which is in close contact and slides against the seal face of the rotary ring; and a partial impeller formed at the outer peripheral portion of a ring shaped body placed on the rotary shaft, in which partial impeller grooves from the one end face of the ring shaped body to the outer peripheral face is formed by equally distributing along a peripheral direction of the outer peripheral portion of the ring shaped body, and characterized in that a ratio (nLgw/2πr) of a total length of a width (nLgw) of the partial impeller grooves against a total peripheral length (2πr) formed with the partial impeller grooves of the partial impeller is 0.28 or more and 0.8 or less.

Also, still another mechanical seal of the present invention is a mechanical seal sealing a space between the housing of an apparatus and a rotary shaft penetrating the bore formed at the housing, comprising: a rotary ring provided at the rotary shaft and formed with a seal face on at least one face in the axis direction; a stationary ring formed with a seal face which is in close contact and slides against the seal face of the rotary ring; a casing which is provided with the stationary ring, stores the rotary ring in the inner space of the rotary ring and placed around the bore of the housing; a cooling fluid inlet bore penetrating in between an outer peripheral portion of the casing and the inner space, and providing a cooling fluid to the inner space from outside of the casing; a cooling fluid outlet bore penetrating in between the outer peripheral portion of the casing and the inner space, and discharging the cooling fluid to outside from the inner space; a partial impeller formed at the outer peripheral portion of a ring shaped body placed on the rotary shaft, in which partial impeller grooves from the one end face of the ring shaped body to the outer peripheral face is formed by equally distributing along a peripheral direction of the outer peripheral portion of the ring shaped body; and a cooler solution outlet bore which is a ring shaped groove formed along the peripheral direction of a face opposing the partial impeller of an inner peripheral of the casing, in which a dam having a predetermined width covering the grooves in the width direction is formed in part of the grooves and an opening of the inner space side of the cooling fluid outlet bore is formed in front of the dam along the rotating direction of the rotary shaft, and characterized in that a ratio (Lgs/Ldl) of a protruding length (Lgs) of the tip portion the partial impeller grooves of the partial impeller against a width (Ldl) of the cooler solution outlet bore of the casing is larger than 0 and 0.65 or less.

Any of the mechanical seal according to the present invention provides the mechanical seal capable to secure the flow rate of the cooling fluid necessary for cooling the sliding seal face, and also having the partial impeller capable to prevent the generation of the erosion.

BRIEF DESCRIPTION OF THE DRAWINGS

FIG. 4A is a figure explaining the placement of the cooler solution discharge groove, the dam and the opening of the cooler solution outlet bore, and the placement of the cooler solution discharge groove and the partial impeller groove in the axis direction, further it also show the planar view of nearby area of the dam of the cooler solution discharge groove of the inner peripheral face of the casing.

FIG. 4B shows the shape of the atmosphere side end portion of the partial impeller groove in the radius direction.

FIG. 4C shows the cross section of the cooler solution discharge groove and the partial impeller groove in the depth direction.

FIG. 6A shows the depth of the erosion during the acceleration test using the casing of soft steel.

FIG. 6B shows the depth of the erosion during the test suing the casing of the metal material usually used.

FIG. 8A shows the depth of the erosion during the acceleration test using the casing of the soft steel.

FIG. 8B shows the depth of the erosion during the test using the casing of the metal material usually used.

FIG. 10A shows the depth of the erosion during the acceleration test using the casing of the soft steel.

FIG. 10B shows the depth of the erosion during the test using the casing of the metal material usually used.

BEST MODE FOR CARRYING OUT THE INVENTION

The mechanical seal apparatus of one embodiment according to the present invention will be explained based on FIG. 1 to 4C.

In the present embodiment, the mechanical seal apparatus provided in a cartilage style to the outer surface of the body of the apparatus in which the rotary shaft of the pump penetrates will be used as an example to explain the present invention. The mechanical seal apparatus of the present embodiment is constituted so that the heat at the sliding seal face is cooled by flushing the cooling fluid around the sliding seal face, and the partial impeller is provided near the sliding seal face in order to circulate the cooling fluid.

First, the entire constitution of the mechanical seal apparatus 100 will be explained base on FIG. 1.

Figure 1:
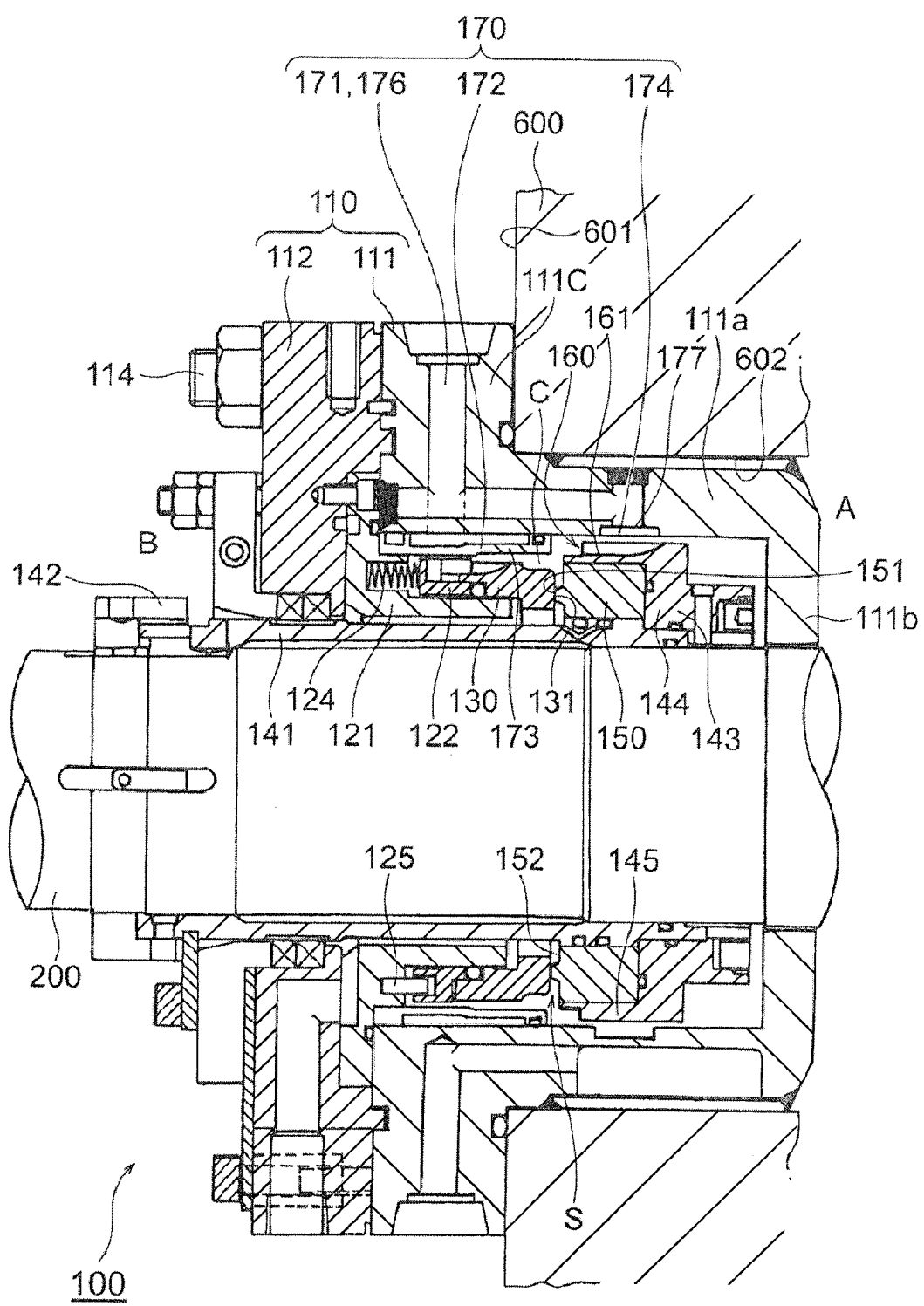
FIG. 1 show the entire constitution of the mechanical seal apparatus of an one embodiment of the present invention.

FIG. 1 is the cross section showing the constitution of the mechanical seal apparatus 100 according to the present embodiment, and also shows the status in which the mechanical seal apparatus 100 is placed to the outer face 601 of the apparatus housing 600.

As shown in FIG. 1, at the apparatus housing 600, the axial bore 602 is formed in which the rotary shaft penetrates through, and the mechanical seal apparatus 100 is provided at outer face 601 surrounding the axial bore 602.

Note that, in FIG. 1, the axial bore 602 side (the right side in the figure) is the inside space A, and the opposite side in the axial direction (the left side in the figure) is the outside, that is the atmosphere space B.

The mechanical seal apparatus 100 comprises, as a main constitution parts, the casing 110, the stationary ring mounting part 121, the stationary ring supporting part 122, the stationary ring 130, the sleeves 141, the seal collar 143, the rotary ring 150, the partial impeller 160 and the cooler solution passage parts 170.

The casing 110 comprises the first casing 111 provided on the inside, and the second casing 112 provided on the outside. The first casing 111 comprises the tubular part 111a engaged at the axial bore 602 of the apparatus housing 600, the inside flange part 111b formed in an inner diameter direction on the inside of the tubular part 111a, and an outer machines side flange part 111c formed in an outer diameter direction at the end portion on the outside of the tubular part. The second casing 112 is a ring shaped member, and is provided on the outside of the first casing 111 and fixed in close contact with the end face on the outside of the outside flange part 111c of the first casing 111. The first casing 111 and the second casing 112 are integrally formed coaxially, thereby the tubular part 111a of the first casing 111 is engaged to the axial bore 602 of the apparatus housing 600 and the outside flange part 111c of the first casing 111 is in close contact with the outer face 601 of the apparatus housing 600; thereby the apparatus housing 600 is fixed by volt 114.

The outside flange part 111b of the first casing 111 and the second casing 112 are formed to have smaller diameter than the inner circumference of the tubular part 111a of the first casing 111 so that the inner circumference of both are placed in close contact with the outer peripheral face of the rotary shaft 200. Hence, the stationary ring 130, the rotary ring 150 and the sliding seal face S formed thereby can be placed to the inner space C of the tubular part 111a of the first casing 111 formed thereby.

The stationary ring mounting part 121 is a ring shape member with a cross section having L shape for mounting the stationary ring 130 to the casing 110. The stationary ring mounting part 121 is provided to the casing 110 by fixing the face of the radial direction having a flange shape using the volt to the inner circumference face of the end face on the inside of the second casing 112. Under this condition, the tubular part of the stationary ring mounting part 121 is placed in close contact with the outer peripheral face of the rotary shaft 200 having approximately the same inner circumference of the second casing 112, thereby the stationary ring supporting part 122 and the stationary ring 130 are engaged. At the stationary ring mounting part 121, the springs 124 are provided by equally distributing along the circumferential direction which resiliently press the stationary ring supporting part 122 towards the inside of the axial direction (the rotary ring 150 side), and also the knock pin 125 is provided or are provides at plurality of positions in order to prevent the stationary ring supporting part 122 from rotating.

The stationary ring supporting part 122 is a ring shaped member provided by engaging at the outer peripheral of the tubular part of the stationary ring mounting part 121, and it is also a member to hold the stationary ring 130. At the end face of the stationary ring 130 side of the stationary ring supporting part 122, the step projecting towards the inner circumference side is formed. To this step, the back face of the stationary ring 130 which is formed into a step projecting out towards the outer peripheral side (the face of the opposite side in the axial direction of the seal face 131) along the circumferential direction is engaged.

At the concave face at the outer circumference side of the end face of the stationary ring 130 side of the stationary ring supporting part 122, the projections is formed at one place or at plurality of places which engages with the notch formed at the convex face of the outer circumference side of back face of the stationary ring 130. Thereby the stationary ring 130 is whirl-stopped.

Also, at the end face of the opposite side against the stationary ring 130 side of the stationary ring supporting part 122, each of the end part of the plurality of spring 124 provided to the stationary ring mounting part 121 is fixed, and also the notch is formed which the knock pin 125 provided on the stationary ring supporting part 122 is inserted therein.

The stationary ring 130 is a seal ring at the stationary side constituting the sliding seal face S of the mechanical seal apparatus 100, and is a ring shaped member comprising the seal face 131 at the end face on the inside. This seal face 131 is in close contact with the seal face 151 of the rotary ring 150 so that it can slide against the seal face 151 of the rotary ring 150, which will be described in the following, and seals between the outer circumference side communicating to the outside space A and the inner circumference side communicating to the atmosphere space B.

The inner circumference part at back face side of the stationary ring 130 is formed at the step face which has larger diameter than the sliding seal face S side. By fitting the tip part on the inside of the stationary ring mount part 121 to this step face, the stationary ring 130 is held coaxially to the stationary ring mounting part 121.

Further, the end part at the back face side of the stationary ring 130 which engages to the stationary ring mounting part 121 is formed into a step in which the outer circumference side is projecting out along the circumference direction, as mentioned in the above. This step is fitted to the step in which the end face on the inside of stationary ring supporting part 122 projects out. Under this condition, in between the step face (the inner circumference face) of the stationary ring 130 fitted to the stationary ring supporting part 122 and the outer circumference face of the stationary ring mounting part 121, in other words, in between the end face on the inside of the projection part of the inner circumference side of the stationary ring supporting part 122 and the end face of the atmosphere side of the step part of the inner circumference side of the stationary ring 130, which opposes against each other, the O ring which seals between the stationary ring 130 and the stationary ring mounting part 121 is present.

At the outer circumference part of the end part of the atmosphere side of the stationary ring 130, the notch is formed which the projection part provided at the stationary ring supporting part 122 engages. By engaging the projection part of the stationary ring supporting part 122 with this notch, the stationary ring 130 is whirl-stopped against the stationary ring supporting part 122.

Thereby the stationary ring 130 is provided at the casing 110 in a movable manner within the predetermined range in the axial direction, but whirl-stopped against the stationary ring mounting part 121 and the stationary ring supporting part 122 in a circumference direction.

The sleeve 141 is a tubular member fitted closely to the circumference face of the rotary shaft 200 by placing the O ring therebetween. The sleeve 141 is fixed to the rotary shaft 200 by sleeve collar 142 at the end part on the outside, and the rotary ring 150 is held together with the seal collar 142 at the end part on the inside.

The sleeve collar 142 fixes the sleeve 141 and the seal collar 143 to the rotary shaft 200 while allowing to pivot integrally with the rotary shaft 200.

The seal collar 143 is fixed to the rotary shaft 200 integrally with the sleeve 141, and holds the rotary ring 150 in between the sleeve 141. The seal collar 143 comprises the collar part 144 of the circular ring shape provided in the radius direction of the rotary shaft 200, and the tubular part 145 formed from the outer circumference part of the collar 144 on the outside (the stationary ring 130 side).

In regards with the seal collar 143, the rotary ring 150 is provided so that the back face thereof (the end face of the opposite side of the seal face 151 in axial direction, the end face on the inside) contacts. Thereby the seal collar 143 regulates the movement of the rotary ring 150 towards the inside in a axial direction, and determines the position of the rotary ring 150 in the axial direction.

Also, at the seal collar 143, the rotary ring 150 is fit at the inner circumference face of the tubular part 145, and holds the rotary ring 150 in between the sleeve 141.

Also, at the outer circumference of the tubular part 145 of the seal collar 143, the partial impeller 160 according to the present invention is formed.

The rotary ring 150 is the seal ring at the rotating side which constitutes the sliding seal face S of the mechanical seal apparatus 100, and is a ring shaped member comprising the seal face 151 at the end face of the atmosphere side. The seal face 151 of the rotary ring 150 is formed by projecting out one step along the circumference direction from the atmosphere side end face 152 having the ring shape. This seal face 151 closely contacts so that it can slide against the seal face 131 of the above mentioned stationary ring 130, thereby seals the outer circumference side communicating to the inside space A and the inner circumference side communicating to the atmosphere space B.

The rotary ring 150 is held by fitting in between the outer circumference face of the sleeve 141 provided so that it can pivot integrally with the rotary shaft 200 and the inner circumference face of the tubular part 145 of the seal collar 143. Also, the back face of the rotary ring 150 is in contact with the collar part 144 of the seal collar 143. As mentioned in above, the stationary ring 130 is resiliently pressed towards the rotary ring 150 by the spring 124, thereby the rotary ring 150 is also pressed towards the inside in the axial direction via the sliding seal face S (the seal face 131 and the seal face 151). As a result, the rotary ring 150 is held in a condition that the back face thereof is in contact with the collar part 144 of the seal collar 143, and the position in the axial direction is determined.

Note that, the O ring is provided between the rotary ring 150, and the sleeve 141 and the seal collar 143, thereby the inner circumference side and the outer circumference side of the rotary ring 150 is sealed.

Figure 2:
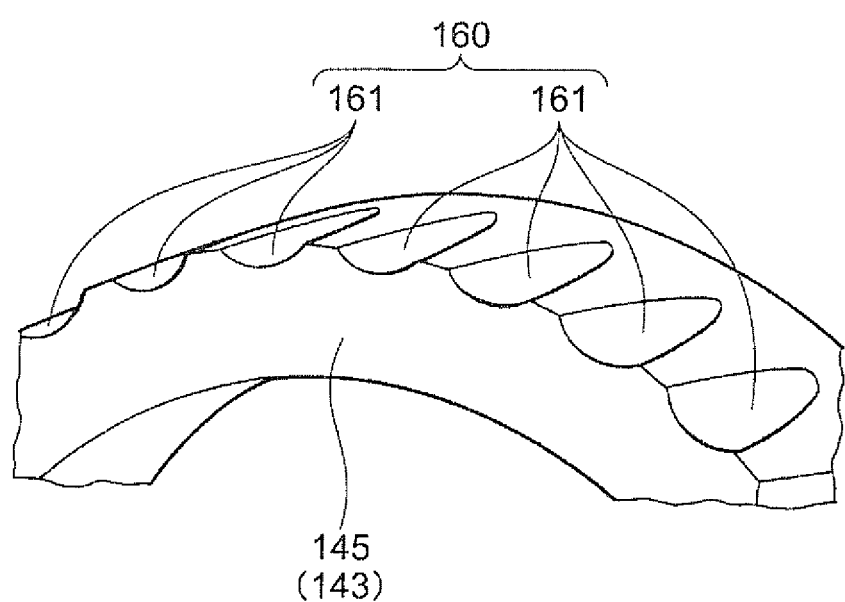
FIG. 2 is a perspective view of the shape of the partial impeller of the mechanical seal apparatus shown in FIG. 1.

The partial impeller 160 is a constitution which allow the cooling fluid to flow efficiently in a predetermined flow rate to the outer circumference side of the seal face where the seal face 131 of the stationary ring 130 and the seal face 151 of the rotary ring 150 closely contacting and sliding against each other. The partial impeller 160 according to the present embodiment is formed at the outer circumference part of the tubular part 145 of the seal collar 143 placed at the outer circumference side of the rotary ring 150. Specifically, the partial impeller 160 is, as shown in FIG. 2, constituted from plurality of grooves 161 (the partial impeller grooves) formed at the outer circumference face of the tubular part 145. Each partial impeller grooves 161 is a groove having a shape that the cylinder is cut with the angle so that a cross section of the atmosphere side end face is approximately a half-circle shape, and it gradually becomes shallower towards the inside end face.

Note that, the definition of the size of this partial impeller 160 will be described in the following together with the definition of the size of cooler solution flow passage part 170 formed at the casing 110, and comprises the cooler solution inlet bore 171, the tubular member 172, the cooler solution discharge grooves 174 and the cooler solution outlet bore 176.

The cooler solution flow passage part 170 is a flow passage constitution of the cooler solution formed at the casing 110 or so, and it provides the cooler solution provided from the cooler, which is not shown in the figure, placed at the outer part of the casing 110 to the inner space C of the casing 110, plus it is a flow passage to return the cooler solution in the inner space C of the casing 110 to the cooler by discharging to the outer part of the casing 110. In the inner space C of the casing 110, the cooler solution is provided to the outer circumference side of the sliding seal face S between the seal face 131 of the stationary ring 130 and the seal face 151 of the stationary ring 150, and also the cooler solution flows so that it cools the seal face by absorbing the heat generated at the sliding seal face S.

The cooler solution flow passage part 170 comprises the cooler solution inlet bore 171, the tubular member 172, the cooler solution discharge groove 174 and the cooler solution outlet bore 176.

The cooler solution inlet bore 171 is the fluid flow passage communicating to the inner space C from the outer circumference face of the casing 110, and also it is a passage to provide the cooler solution provided from the cooler not shown in the figure via the pipe to the inner space C of the casing 110. The opening of the end face of the surface side of the casing 110 of the cooler solution outlet bore 171 is formed at the port formed with the screw hole for the pipe connectable with the pipe not shown in the figure. According to the present embodiment, one cooler solution inlet bore 171 is formed, and two flow passages including one cooler solution outlet bore 176 which will be described in the following is provided by equally distributing in the circumference direction of the casing 110.

The tubular member 172 is placed around the atmosphere side of the rotary ring 150 along the inner circumference face of the inner space C of the casing 110 within the small space from the inner circumference face. Further, the tubular member 172 is a member to directly guide the cooler solution to flow into the inner space C of the casing 110 via the cooler solution inlet bore 171 to the outer circumference side of the sliding seal face S. The cooler solution provided to the inner space C of the casing 110 via the cooler solution inlet bore 171 contacts the outer circumference face of the tubular member 172 and flows along the outer circumference face thereof, thereby the cooler solution is introduced near the sliding seal face from the cooler solution introduction opening 173 formed at the sliding seal face S side of the tubular member 172. Thus, the cooler solution can be provided directly to the outer circumference part of the sliding seal face S. Note that, the number of the cooler solution introduction opening 173 formed at the sliding seal face S side of the tubular member 172 is not particularly limited, and it may be any arbitrary number.

The cooler solution discharge groove 174 is a groove having a predetermined width and depth along the circumference direction and formed at the face opposing the outer circumference face of the tubular part 145 of the seal collar 143 where the partial impeller 160 is formed.

Figure 3:
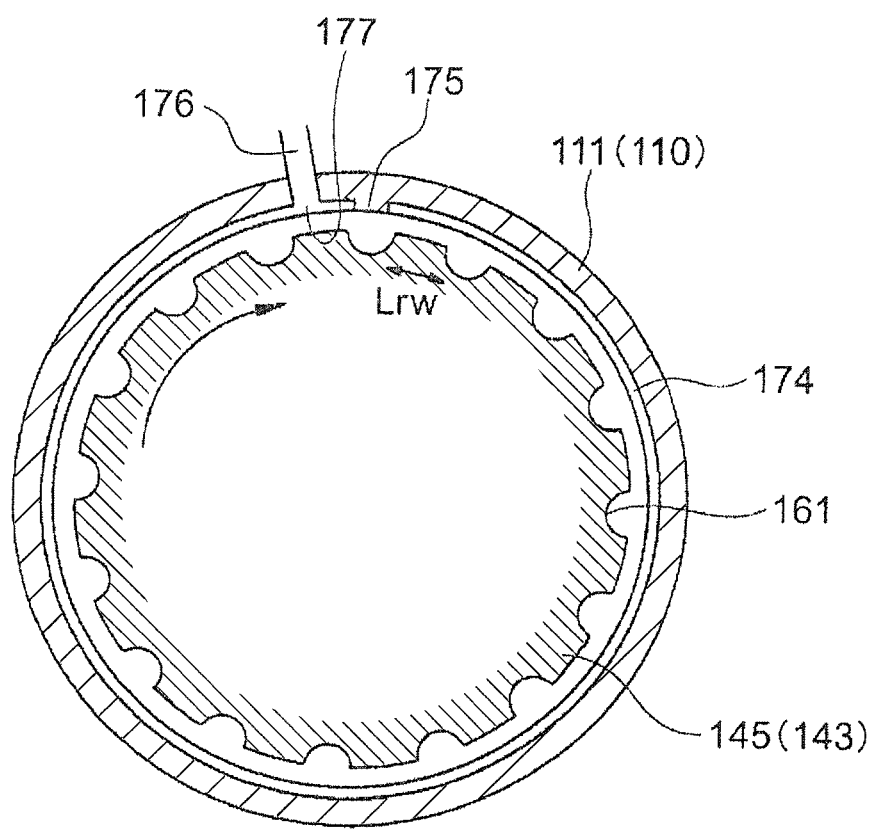
FIG. 3 is a cross sectional view in the radius direction showing the constitution and the placements of the partial impeller, the cooler solution discharge groove, the dam, and the cooler solution outlet bore of the mechanical seal apparatus shown in FIG. 1.

The constitution of the cooler solution discharge groove 174 and nearby thereof is explained based on FIG. 3.

FIG. 3 is a cross section in a radial direction showing the constitution and the placement of the partial impeller 160, the cooler solution discharge groove 174, the dam 175 and the cooler solution outlet bore 176.

As shown in FIG. 3, the cooler solution discharge groove 174 formed around the entire circumference along the inner circumference face of the casing 110 except for the one part where the dam 175. The dam 175 is a part held to have the same height as the inner circumference face (the part of the inner circumference face where the cooler solution discharge groove 174 is not formed) of the casing 110 so that it crosses the cooler solution discharge groove 174, and the dam 175 is a constitution to divide the cooler solution discharge groove 174 without revolving.

Also, at the part which is the base face of the cooler solution discharge groove 174 and the front part of the dam 175 along the rotating direction of the rotary shaft 200, the opening 177 of the inner space C side of the casing 110 of the cooler solution outlet bore 176 is formed.

Thereby, the cooler solution controlled to flow in the outer radial direction by the partial impeller 160 flows within the cooler solution discharge groove 174 in the circumference direction along the rotating direction of the rotary shaft 200. Also, although the flow along the cooler solution discharge groove 174 is regulated by contacting the dam 175, it is guided to the cooler solution outlet bore 176 from the opening 177 of the cooler solution outlet bore 176 formed there, thereby it is discharged to outside of the casing 110 via the cooler solution outlet bore 176. The flow rate of the cooler solution can be enlarged by at least guiding the flow in such direction using the cooler solution discharge groove 174, the cooler solution outlet bore 176 and the opening 177 of the cooler solution outlet bore 176.

The size and the placement of the partial impeller 160 and the cooler solution flow passage part 170 having such constitution is described based on FIG. 3 and FIG. 4A to FIG. 4C.

Figure 4A:
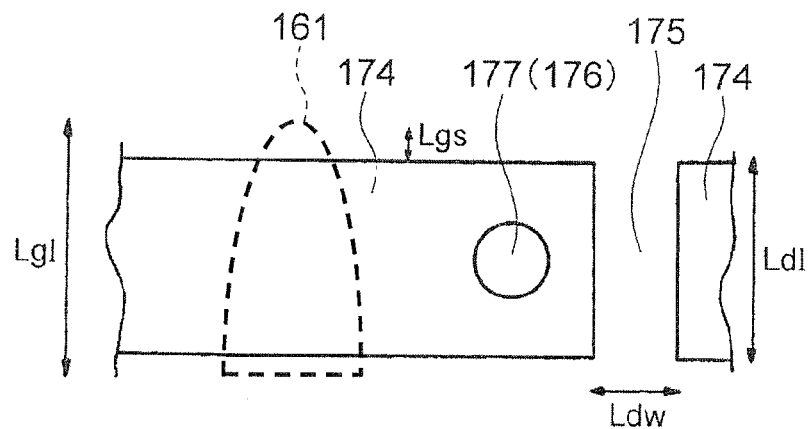
FIG. 4A, together with FIG. 4B and FIG. 4C, is a figure explaining the size and the placement of the partial impeller and a cooler solution flow passage shown in FIG. 2 and FIG. 3, and also
Figure 4B:
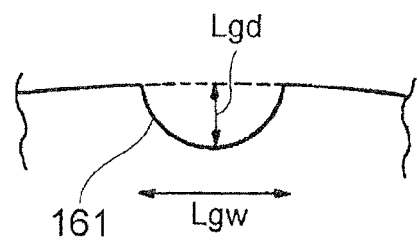
FIG. 4B, together with FIG. 4A and FIG. 4C, is a figure explaining the size and the placement of the partial impeller and a cooler solution flow passage shown in FIG. 2 and FIG. 3.
Figure 4C:
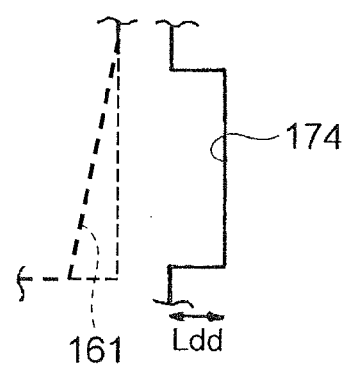
FIG. 4C, together with FIG. 4A and FIG. 4B, is a figure explaining the size and the placement of the partial impeller and a cooler solution flow passage shown in FIG. 2 and FIG. 3.

FIG. 4A to FIG. 4C are the figures describing the size and the placement of the partial impeller 160 and the cooler solution passage part 170. FIG. 4A is a plane section of the near by area of the dam 175 of the cooler solution discharge groove 174 of the inner circumference face of the casing 110 in order to describe the placement of the cooler solution discharge groove 174, the dam 175 and the opening 177 of the cooler solution outlet bore 176, and the placement in the axial direction of the cooler solution discharge groove 174 and the partial impeller groove 161. FIG. 4B is a figure showing the shape of the atmosphere side end part of the partial impeller groove 161 in the radial direction. FIG. 4C is a figure showing each cross section in the axial direction of the cooler solution discharge groove 174 and the partial impeller groove 161 at the deepest part.

According to the mechanical seal apparatus 100 of the present embodiment, the size and the placement of the partial impeller 160 and the cooler solution flow passage part 170 is defined as following as the constitution ensuring the flow rate of 600 l/h (litter/hour) as an example.

First, in regards with the partial impeller groove 161 constituting the partial impeller 160, the ratio Lgw/Lgd between the width Lgw and the depth Lgd of the partial impeller groove 161 is within the range of 2.0 or more and 5.0 or less, as the maximum range.

Also, in regards with the width of the partial impeller 160 and the cooler solution discharge groove 174 excluding the width of the grooves, the ratio Lrw/Ldw between the distance Lrw in between the grooves of the partial impeller 160 and the width Ldw of the dam 175 of the cooler solution discharge groove 174 is within the range of 0.5 or more and 3.1 or less, as the maximum range.

Also, the ratio $nLgw/2\pi r$ of the total length nLgw of the grooves 161 of the partial impeller 160 against the circumference length $2\pi r$ of the partial impeller 160 is within the range of 0.28 or more and 0.8 or less, as the maximum range.

Furthermore, the ratio Lgs/Ldl of the projecting distance of the tip portion of the groove 161 of the partial impeller 160 against the width Ldl of the cooler solution discharge groove 174 at the casing 110 side is more than 0 and 0.65 or less, as the maximum range.

Hereinafter, the reason why it is preferable to define the size and the placement of the partial impeller 160 and the cooler solution flow passage part 170 as described in above will be shown by the experiment examples based on FIG. 5 to FIG. 11B showing the results of the experiments.

In the experiment, under each condition of the partial impeller 160 and the cooler solution flow passage 170, two types of pumps A and B and two types of the casing materials were used, and under each combination of the pumps and the materials, the flow rate of the partial impeller 160 was detected. Also, in the experiment, the pump was continuously operated for several to several hundred hours to verify the condition of the erosion.

The pump A is a pump driven under the condition of 0.235 MPa of sealed fluid pressure, 25° C. of the fluid temperature, the rotation speed of 3600 rpm. The pump B is a pump driven under the condition of 0.127 MPa of sealed fluid pressure, 25° C. of the fluid temperature, the rotation speed of 4520 rpm. For the operation condition of either pump, the sealed fluid pressure was set within the range of 0.1 to 0.4 MPa in which the erosion is generated.

Also, as the casing, those using the metal material ($\alpha$) usually used as the material and those using the soft steel ($\beta$) as the material were prepared, and applied to each pump for the experiment. That using the soft steel ($\beta$) as the material was used for the acceleration test to accelerate the erosion. The test length of the test using the casing of the soft steel ($\beta$) was 5 hours, and the tendency of the depth of the erosion was examined. Also, the test length of the test using the casing of the metal material ($\alpha$) usually used was 3000 hours, and the erosion was examined.

Note that, in either condition, the object is to obtain the flow rate of 600 l/h.

First, the relation between the ratio Lgw/Lgd which is the ratio between the width Lgw and the depth Lgd of one partial impeller groove 161 constituting the partial impeller 160 and the depth of the erosion per flow rate and unit time was detected by the experiment. Note that, as the shape of the partial impeller groove 161, as shown in FIG. 2, the shape in which the cylinder being cut with an angle were used.

Figure 5:
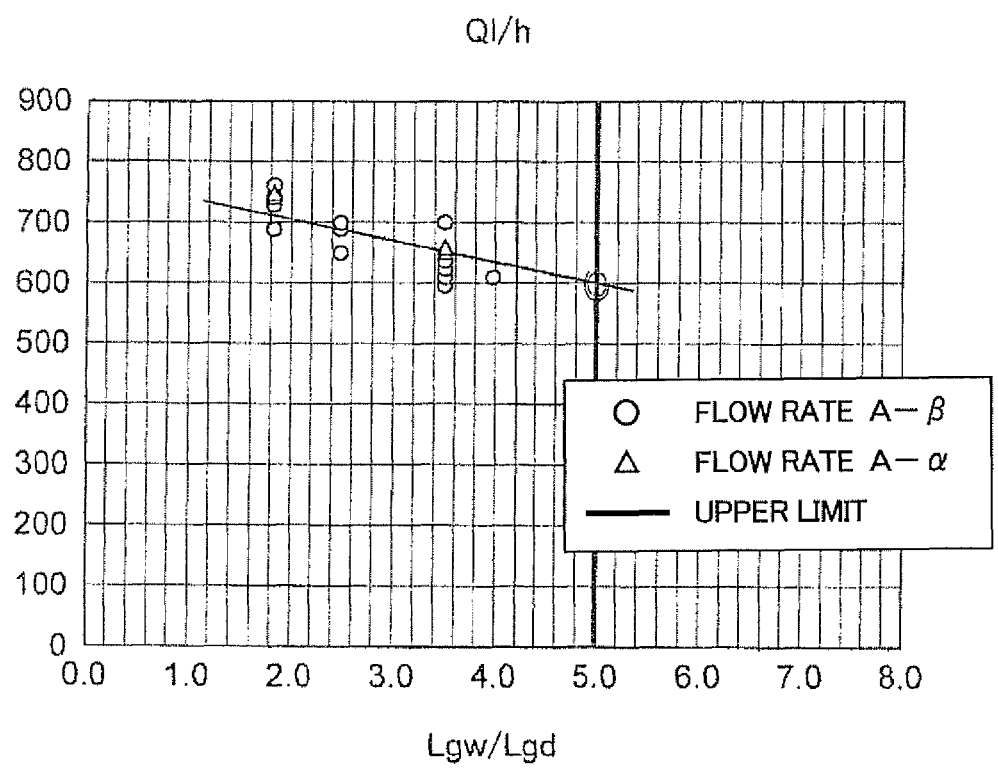
FIG. 5 shows the relation between the flow rate and the ratio between the depth and the width of the partial impeller groove.
Figure 6A:
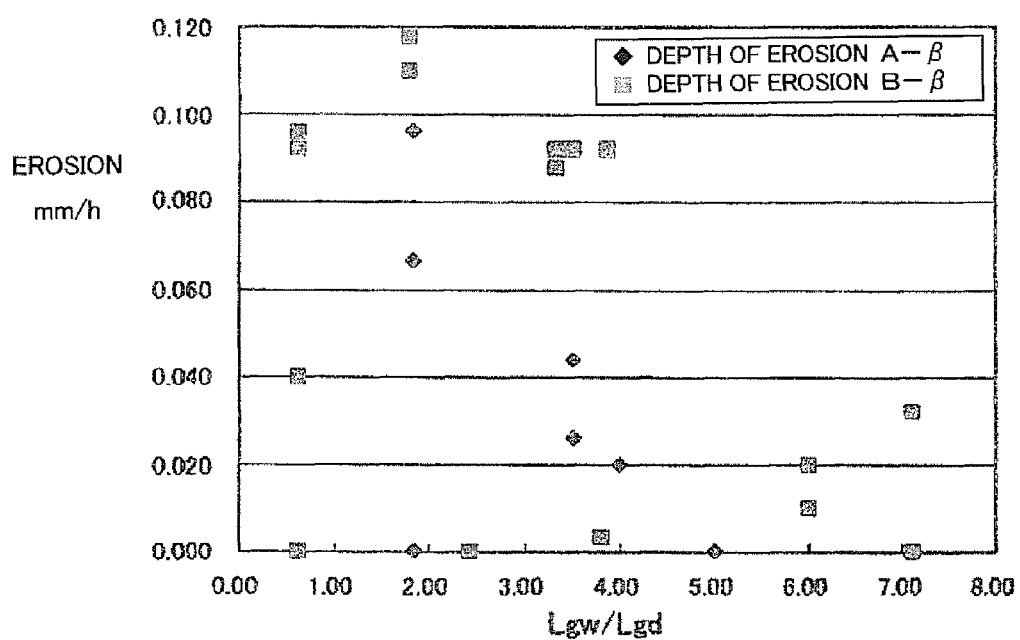
FIG. 6A shows the depth of the erosion per unit time and the ratio between the depth and the width of the partial impeller groove, and also
Figure 6B:
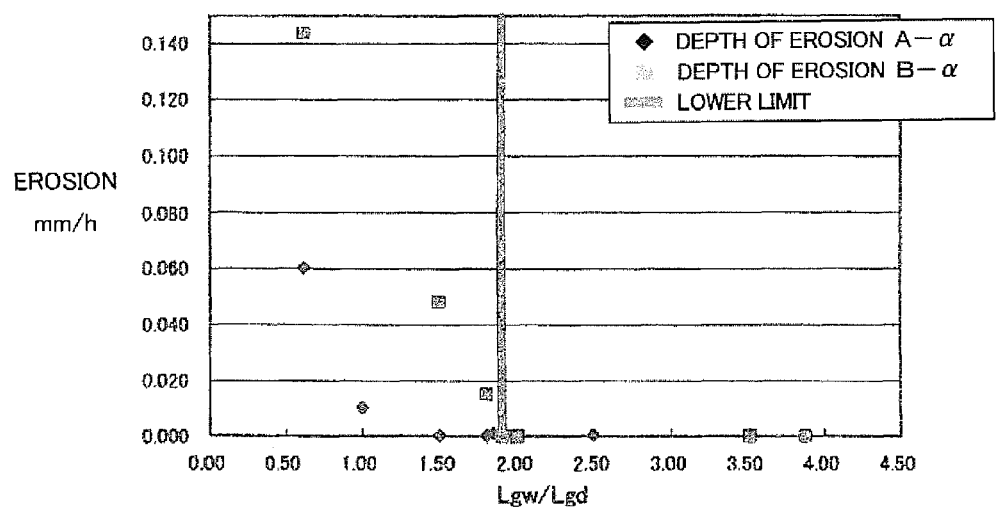
FIG. 6B shows the depth of the erosion per unit time and the ratio between the depth and the width of the partial impeller groove, and also

The result of the experiment is shown in FIG. 5, FIG. 6A and FIG. 6B. FIG. 5 shows the relation between the flow rate and the ratio Lgw/Lgd of the width Lgw and the depth Lgd of the partial impeller groove 161. FIG. 6A and FIG. 6B both show the depth of the erosion per unit time and the ratio Lgw/Lgd of the width Lgw and the depth Lgd of the partial impeller groove 161. FIG. 6A shows the depth of the erosion during the acceleration test using the casing of the soft steel ($\beta$), and FIG. 6B show the depth of the erosion during the acceleration test using the casing of the metal material ($\alpha$) usually used.

It is clear from FIG. 5, in regards with the flow rate, that the experiment carried out under any condition exceeded 600 l/hour, thus the necessary flow rate was secured. However, the approximation line shows that as the ratio Lgw/Lgd of the width Lgw and the depth Lgd of the partial impeller groove 161 becomes larger, the flow rate becomes less, and it show that the flow rate reaches 600 l/h when Lgw/Lgd is 5.0. Therefore, it is necessary to set the ratio Lgw/Lgd of the width Lgw and the depth Lgd of the partial impeller groove 161 to 5.0 or less in order to secure the necessary flow rate.

Also, FIG. 6A show that as the value of the ratio Lgw/Lgd of the width Lgw and the depth Lgd of the partial impeller groove 161 becomes larger, the depth of the erosion becomes shallower.

Also, FIG. 6B show that erosion is generated even when the ratio Lgw/Lgd of the width Lgw and the depth Lgd of the partial impeller groove 161 is small, and as it becomes smaller, the depth of the erosion per unit time tends to be larger. Therefore, in order to suppress the erosion depth per unit time to 0 (below the detection limit value), according to the experiment result, it is necessary that the ratio Lgw/Lgd of the width Lgw and the depth Lgd of the partial impeller groove 161 is at least 2.0 or more.

Next, the relation between the ratio Lrw/Ldw of the distance Lrw between the groove 161 of the partial impeller 160 (refer to FIG. 3) and the width Ldw of the dam 175 at the casing 110 side, and the depth of the erosion of the flow rate and per unit time was detected from the experiment.

Figure 7:
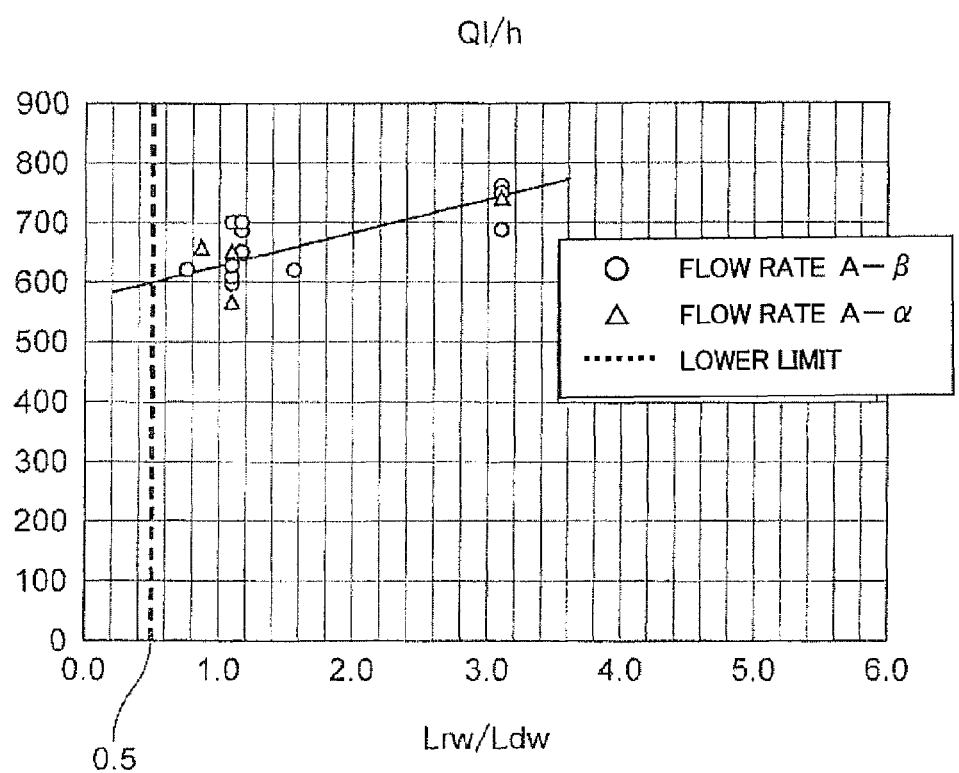
FIG. 7 shows the relation between the flow rate and the ratio of the distance in between the grooves of the partial impeller and the width of the dam of the casing side.
Figure 8A:
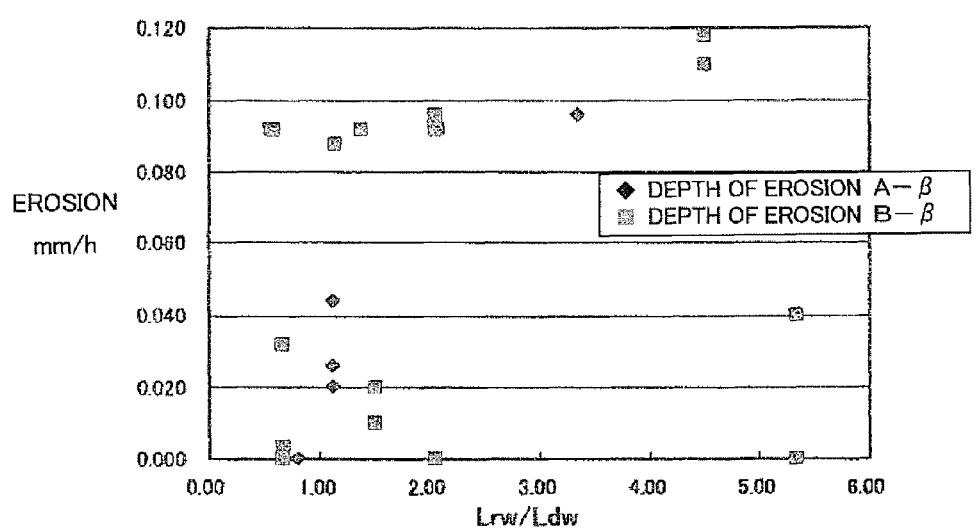
FIG. 8A shows the ratio of the distance in between the grooves of the partial impeller and the width of the dam at the casing side and the depth of erosion per unit time, and also
Figure 8B:
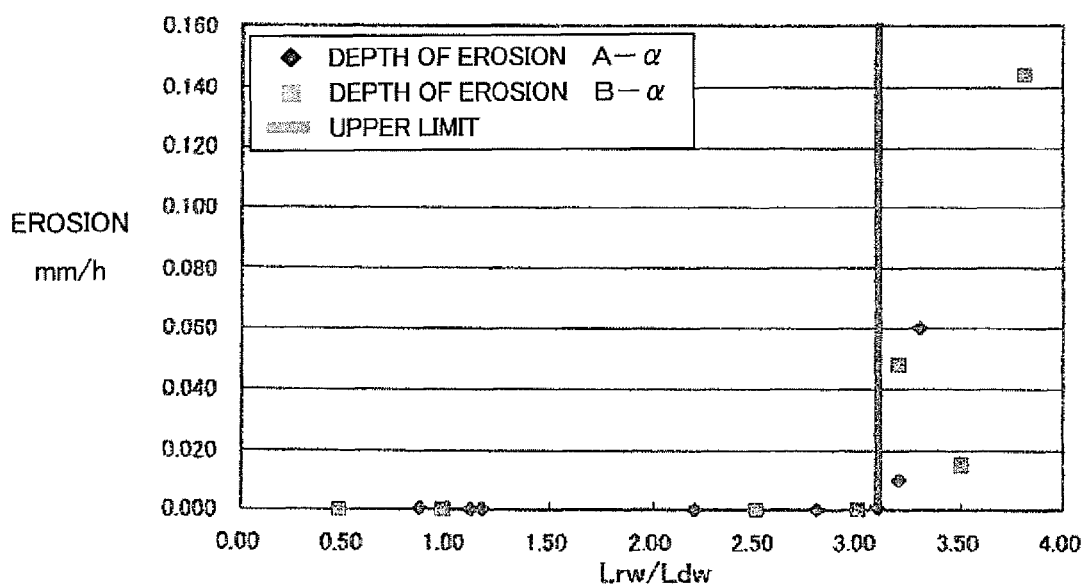
FIG. 8B shows the ratio of the distance in between the grooves of the partial impeller and the width of the dam at the casing side and the depth of erosion per unit time, and also

The experiment result are shown in FIG. 7, FIG. 8A and FIG. 8B. FIG. 7 show the relation between the flow rate and the ratio Lrw/Ldw of the distance Lrw between the groove 161 of the partial impeller 160 and the width Ldw of the dam 175 at the casing 110 side. FIG. 8A and FIG. 8B both show the ratio Lrw/Ldw of the distance Lrw between the groove 161 of the partial impeller 160 and the width Ldw of the dam 175 at the casing 110 side and the depth of the erosion per unit time. FIG. 8A show the depth of the erosion during the acceleration test using the casing of the soft steel (β), and FIG. 8B show the depth of the erosion during the acceleration test using the casing of the metal material (α) usually used.

It is clear from FIG. 7, in regards with the flow rate, the experiment carried out under any condition exceeded 600 l/hour, and thus the necessary flow rate was secured. However, the approximation line show that as the ratio Lrw/Ldw of the distance Lrw between the groove 161 of the partial impeller 160 and the width Ldw of the dam 175 at the casing 110 side becomes smaller, the flow rate decreases, and the flow rate reaches approximately 600 l/h when Lrw/Ldw is 0.5. Therefore, it is necessary to set the ratio Lrw/Ldw of the distance Lrw between the groove 161 of the partial impeller 160 and the width Ldw of the dam 175 at the casing 110 side to 0.5 or more in order to secure the necessary flow rate.

Also, FIG. 8A show that as the value of the ratio Lrw/Ldw of the distance Lrw between the groove 161 of the partial impeller 160 and the width Ldw of the dam 175 at the casing 110 side becomes large, the depth of erosion tends to become large.

Also, FIG. 8B show that the erosion is generated when ratio Lrw/Ldw of the distance Lrw between the groove 161 of the partial impeller 160 and the width Ldw of the dam 175 at the casing 110 side is large, and as it becomes large, the depth of the erosion per unit time tends to be large. Therefore, it is clear from the experiment result that it is necessary to set the ratio Lrw/Ldw of the distance Lrw between the groove 161 of the partial impeller 160 and the width Ldw of the dam 175 at the casing 110 side to 3.1 or less in order to suppress the depth of the erosion to 0 (below the detection limit value).

Next, the relation between the ratio nLgw/2πr which is the ratio of the total length n×Lgw (nLgw) of the groove 161 of the partial impeller 160 against the circumference length 2π×r of the atmosphere side end face part of the partial impeller 160, and the depth of the erosion of the flow rate and per unit time was detected from the experiment.

Figure 9:
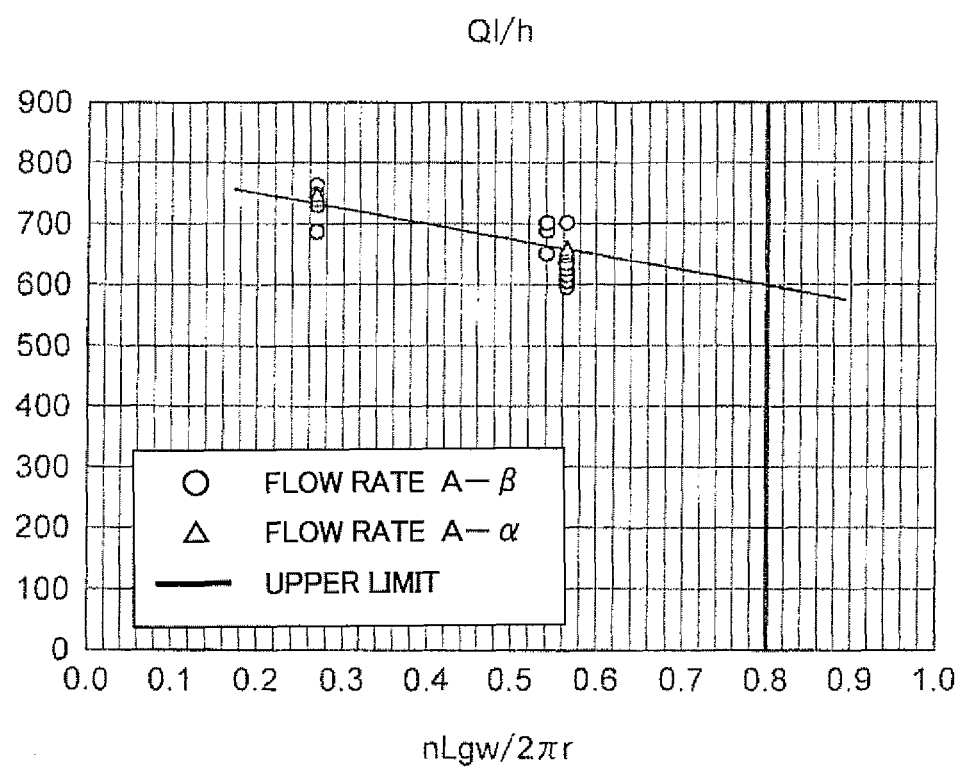
FIG. 9 shows the relation between the flow rate and the ratio of the total length of the grooves of the partial impeller against the length of the peripheral face of the partial impeller.
Figure 10A:
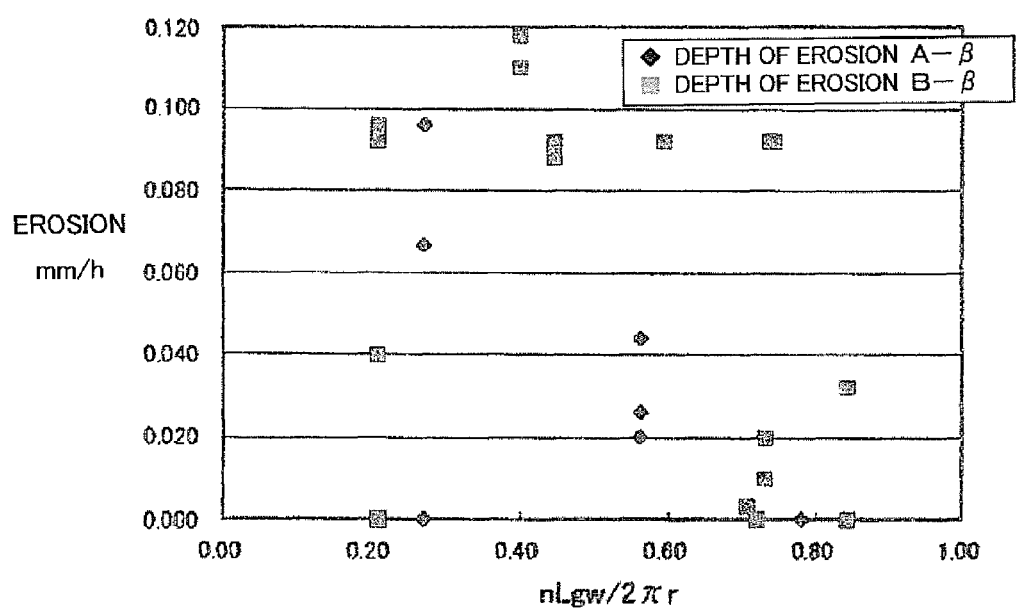
FIG. 10A shows the depth of the erosion per unit time and the ratio of the total length of the grooves of the partial impeller against the length of the peripheral face of the partial impeller, and also
Figure 10B:
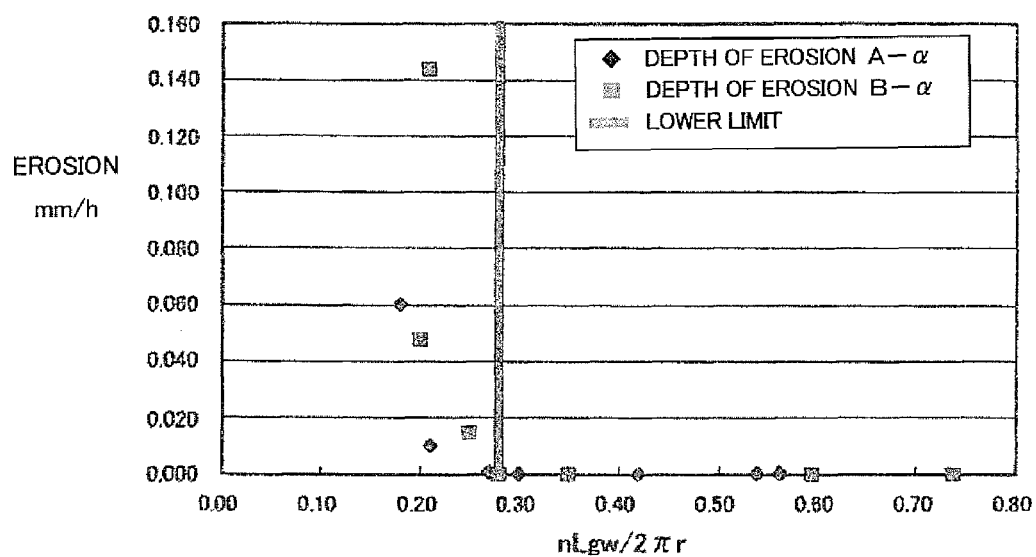
FIG. 10B shows the depth of the erosion per unit time and the ratio of the total length of the grooves of the partial impeller against the length of the peripheral face of the partial impeller, and also

The results of the experiment are shown in FIG. 9, FIG. 10A and FIG. 10B. FIG. 9 shows the relation between the ratio nLgw/2πr of the total length nLgw of the groove 161 of the partial impeller 160 against the circumference length 2πr of the atmosphere side end face part of the partial impeller 160 and the flow rate. FIG. 10A and FIG. 10B both show the relation between the ratio nLgw/2πr of the total length nLgw of the groove 161 of the partial impeller 160 against the circumference length 2πr of the atmosphere side end face part of the partial impeller 160 and the depth of the erosion per unit time. FIG. 10A shows the depth of the erosion during the acceleration test using the casing of the soft steel (β), and FIG. 10B show the depth of the erosion during the acceleration test using the casing of the metal material (α) usually used.

It is clear from FIG. 9, in regards with the flow rate, that the experiment carried out under any condition exceeded 600 l/hour, and thus the necessary flow rate was secured. However, the approximation line show that as the ratio nLgw/2πr of the total length nLgw of the groove 161 of the partial impeller 160 against the circumference length 2πr of the atmosphere side end face part of the partial impeller 160 becomes larger, the flow rate decreases, and the flow rate reaches approximately 600 l/h when nLgw/2πr is 0.8. Therefore, it is necessary to set the ratio nLgw/2πr of the total length nLgw of the groove 161 of the partial impeller 160 against the circumference length 2πr of the atmosphere side end face part of the partial impeller 160 to 0.8 or less in order to secure the necessary flow rate.

Also, FIG. 10A show that as the nLgw/2πr of the total length nLgw of the groove 161 of the partial impeller 160 against the circumference length 2πr of the atmosphere side end face part of the partial impeller 160 becomes large, the depth of the erosion tends to become small.

Also, FIG. 10B show that the erosion becomes large when the ratio nLgw/2πr of the total length nLgw of the groove 161 of the partial impeller 160 against the circumference length 2πr of the atmosphere side end face part of the partial impeller 160 is small, and that as it is smaller, the depth of the erosion tends to be large. Therefore, it is clear from the experiment result that it is necessary to set the ratio nLgw/2πr of the total length nLgw of the groove 161 of the partial impeller 160 against the circumference length 2πr of the atmosphere side end face part of the partial impeller 160 to at least 0.28 or more in order to suppress the depth of the erosion to 0 (below the detection limit value).

Next, the relation between the ratio Lgs/Ldl of the projection distance Lgs of the tip of the groove 161 of the partial impeller against the width Ldl of the cooler solution discharge groove 174 at the casing 110 side, and the depth of the erosion per unit time was detected by the experiment.

Figure 11A:
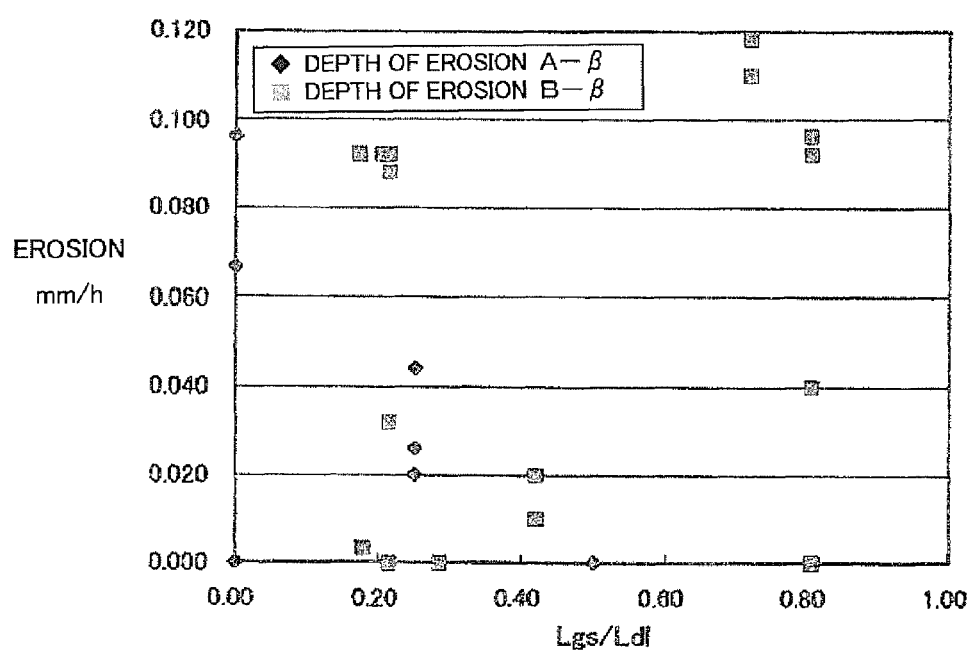
FIG. 11A shows the depth of the erosion per unit time and the ratio of the protruding distance of the tip of the grooves of the partial impeller against the width of the cooler solution discharge groove at the casing side, and the depth of the erosion during the acceleration test using the casing of the soft steel.
Figure 11B:
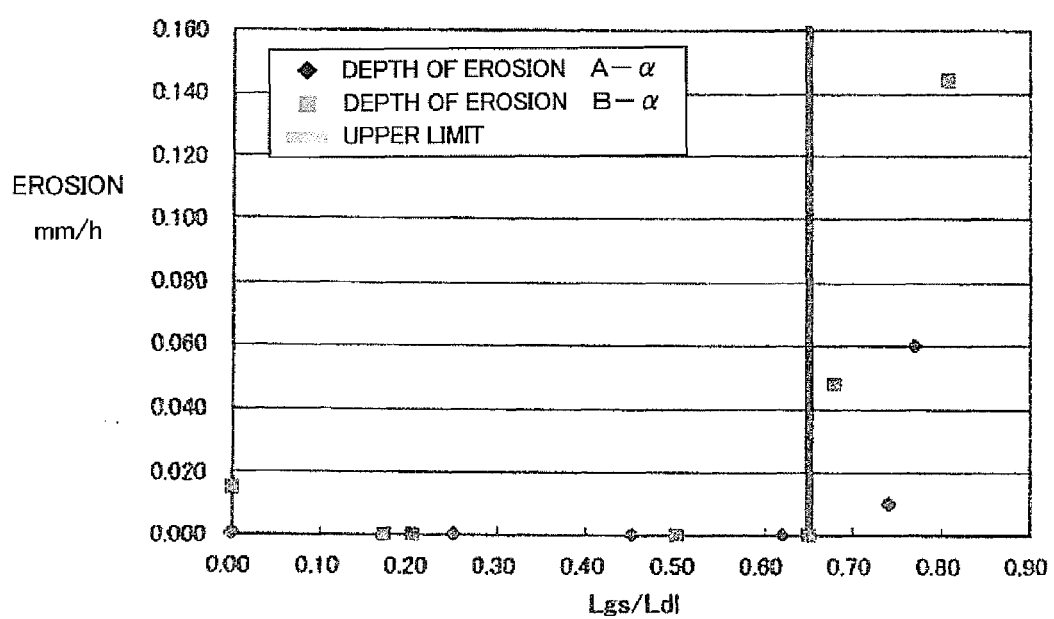
FIG. 11B shows the depth of the erosion per unit time and the ratio of the protruding distance of the tip of the grooves of the partial impeller against the width of the cooler solution discharge groove at the casing side, and the depth of the erosion during the test using the casing of the metal material usually used.
Figure 12:
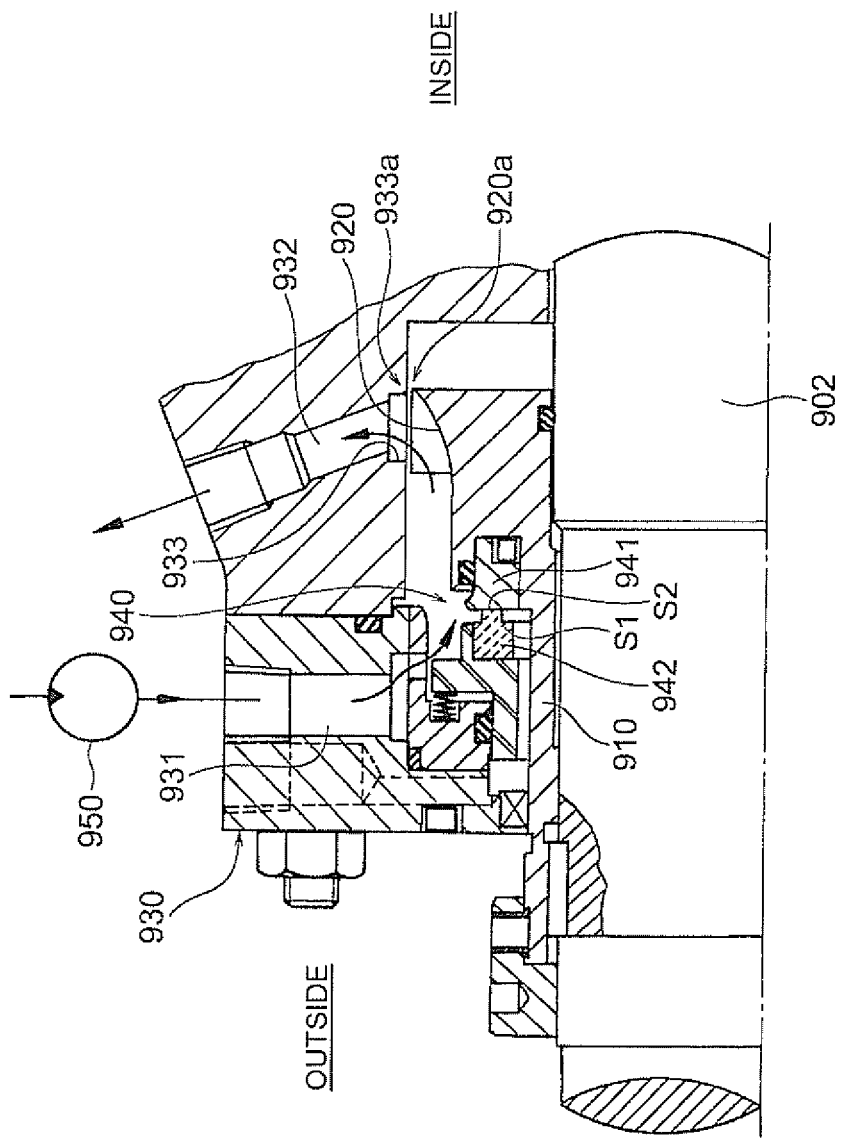
FIG. 12 shows the constitution of the conventional mechanical seal having the partial impeller.

The experiment results are shown in FIG. 11A and FIG. 11B. The FIG. 11A and FIG. 11B both show the relation between the ratio Lgs/Ldl of the projection distance Lgs of the tip of the groove 161 of the partial impeller against the width Ldl of the cooler solution discharge groove 174 at the casing 110 side, and the depth of the erosion per unit time. FIG. 11A shows the depth of the erosion during the acceleration test using the casing of the soft steel (β), and FIG. 11B show the depth of the erosion during the acceleration test using the casing of the metal material (α) usually used.

FIG. 11A show that as the ratio Lgs/Ldl of the projection distance Lgs of the tip of the groove 161 of the partial impeller 160 against the width Ldl of the cooler solution discharge groove 174 at the casing 110 side becomes large, the depth of the erosion becomes small. However, when the value of the Lgs/Ldl becomes to certain value or more, the depth of erosion becomes larger.

Also, FIG. 11B show that the depth of the erosion is large in case the ratio Lgs/Ldl of the projection distance Lgs of the tip of the groove 161 of the partial impeller 160 against the width Ldl of the cooler solution discharge groove 174 at the casing 110 side is large and small. Therefore, it is clear from the experiment result that it is necessary to set the ratio Lgs/Ldl of the projection distance Lgs of the tip of the groove 161 of the partial impeller 160 against the width Ldl of the cooler solution discharge groove 174 at the casing 110 side to at least to larger than 0 and 0.65 or less in order to suppress the depth of the erosion to 0 (below the detection limit value).

According to the mechanical seal apparatus of the present embodiment, the necessary flow rate of the cooling fluid for cooling the sliding seal face can be secured, and also the generation of the erosion can be prevented by setting the size and the placement of the partial impeller 160 and the cooler solution flow passage part 170 as described in above.

Note that, the above mentioned embodiment is described so that the present invention can be understood easily, hence the present invention is not limited thereto. Each element disclosed in the present embodiment includes all of the designing modifications and the equivalents which are within the scope of the present invention, and also many arbitrary preferable changes can be made as well.

For example, as the groove constituting the partial impeller, the shape having an angled cut into the cylinder as shown in FIG. 2 was used in the above mentioned embodiment. However, the shape of the groove is not limited thereto, and the groove having a cylinder shape, the groove having a conical shape or so may be used as well. Also, the cross section of the groove is not limited to half-circle shape, and a quadratic line or so may be used as well.

Also, in the above described embodiment, the dam 175 was provided against the cooler solution discharge groove 174 at only one place, and the cooler solution outlet bore 176 was formed against the casing 110 at only one place as well. However, plurality of these may be provided.

Also, in the above mentioned embodiment, the cooling fluid was a water, however any arbitrary fluid may be used for cooling.

INDUSTRIAL APPLICABILITY

The present invention can be applied to arbitrary mechanical seal which seals against the rotary shaft. Particularly, the cooler solution needs to be circulated, and thus it may be applied to the mechanical seal comprising the partial impeller.

The invention claimed is:

1. A mechanical seal sealing a space between a housing of an apparatus and a rotary shaft penetrating through a bore formed in said housing, comprising:
   a rotary ring provided on said rotary shaft and formed with a seal face at an end face of an atmosphere side in an axial direction;
   a stationary ring formed with a seal face at an end face on an inside in the axial direction, said seal face of said stationary ring contacting and sliding against said seal face of said rotary ring whereby said stationary ring is pressed towards said rotary ring by springs;
   a casing provided with said stationary ring, said casing placed around said bore of said housing and storing said rotary ring in an inner space of said casing;
   a cooler solution inlet bore penetrating in between an outer peripheral portion of said casing and said inner space thereof, said cooler solution inlet bore providing a cooler solution to said inner space of the casing from an outside of said casing;
   a tubular member placed around the stationary ring along an inner circumferential face defining the inner space of the casing and placed within the inner space of the casing, and the tubular member guiding the cooler solution into the inner space of the casing via the cooler solution inlet bore and to an outer circumferential side of the seal face of each of the rotary seal ring and the stationary seal ring;
   a cooler solution introduction opening formed in the tubular member and introducing the cooler solution near the seal faces of the rotary seal ring and the stationary seal ring, wherein the cooler solution is provided to the inner space of the casing via the cooler solution inlet bore and flows along an outer circumferential face of the tubular member;
   a cooler solution outlet bore penetrating in between an outer circumferential face of said casing and said inner space thereof, said cooler solution outlet bore discharging said cooler solution to said outside of said casing from said inner space of the casing;
   a seal collar with a circular ring shape fixed to said rotary shaft, said seal collar contacting a back of said rotary ring to regulate movement of said rotary ring towards the inside in the axial direction and determine a position of said rotary ring in the axial direction;
   a partial impeller formed on an outer peripheral portion of said seal collar, said partial impeller having a plurality of partial impeller grooves extending from an end face of one side of said seal collar to an outer circumferential face of said seal collar, said partial impeller grooves formed equally along a circumferential direction of an outer circumference of said seal collar to direct a flow of said cooler solution to the outer circumferential side of the seal faces of said rotary ring and said stationary ring, where said seal face of said stationary ring and said seal face of said rotary ring closely contact and slide against each other; and
   a ring-shaped cooler solution discharge groove formed on an inner periphery of said casing opposing said partial impeller, said cooler solution discharge groove defining an annular groove formed on the inner periphery of said casing;
   wherein said seal collar prevents said rotary ring from moving towards the inside in the axial direction and fixes an axial position of said rotary ring to said rotary shaft even if said rotary ring is pressed by a pressing force of said springs of said stationary ring;
   wherein each of said partial impeller grooves is a groove having a shape that is a cylinder cut with an angle so that a cross section of each groove at an atmosphere side end face of said seal collar is approximately a half-circle shape, and wherein each of said partial impeller grooves gradually becomes shallower towards an inside end face of said seal collar; and
   wherein said cooler solution discharge groove is divided by a dam so as to prevent said cooler solution discharge groove from forming a communicated circular passage, and said dam has a predetermined width covering said cooler solution discharge groove in a width direction;
   wherein, at a part which is a base face of said cooler solution discharge groove and at a front part of said dam along a rotating direction of said rotary shaft, an opening on an inner space side of said cooler solution outlet bore is formed,
   a ratio (Lgs/Ldl) of a projecting distance (Lgs) of a projecting portion of a tip portion of each partial impeller groove of the partial impeller against a width (Ldl) of the cooler solution discharge groove at the casing is more than 0 and 0.65 or less, said projecting portion of the tip portion being a portion that projects axially beyond the cooler solution discharge groove; and a ratio (Lgw/Lgd) of a maximum width (Lgw) of each of said partial impeller grooves to a maximum depth (Lgd) of each of the partial impeller grooves is 2.0 or more and 5.0 or less.

2. The mechanical seal as set forth in claim 1, wherein a ratio (Lrw/Ldw) of a groove distance (Lrw) which is a distance in between said partial impeller grooves constituting said partial impeller to a width (Ldw) of said dam is 0.5 or more and 3.1 or less, said distance in between said partial impeller grooves being a circumferentially extending distance between immediately adjacent partial impeller grooves, and said width (Ldw) of said dam being a circumferentially extending width.

3. The mechanical seal as set forth in claim 1, wherein a ratio (nLgw/2πr) of a sum of the maximum circumferential width of each of said partial impeller grooves (nLgw) to a total length (2πr) of the outer circumferential face on which said partial impeller grooves of said partial impeller are formed is 0.28 or more and 0.8 or less.

4. The mechanical seal as set forth in claim 1, wherein a ratio (Lgs/Ldl) of a protruding length (Lgs) of the tip portion of each partial impeller grooves of said partial impeller to a width (Ldl) of said cooler solution discharge groove of said casing is larger than 0.3 and 0.65 or less.

5. The mechanical seal as set forth in claim 1, wherein said cooler solution discharge groove includes an axially extending length that is less than an axially extending length (Lgl) of each of said partial impeller grooves.

* * * * *